Patented Nov. 27, 1928.

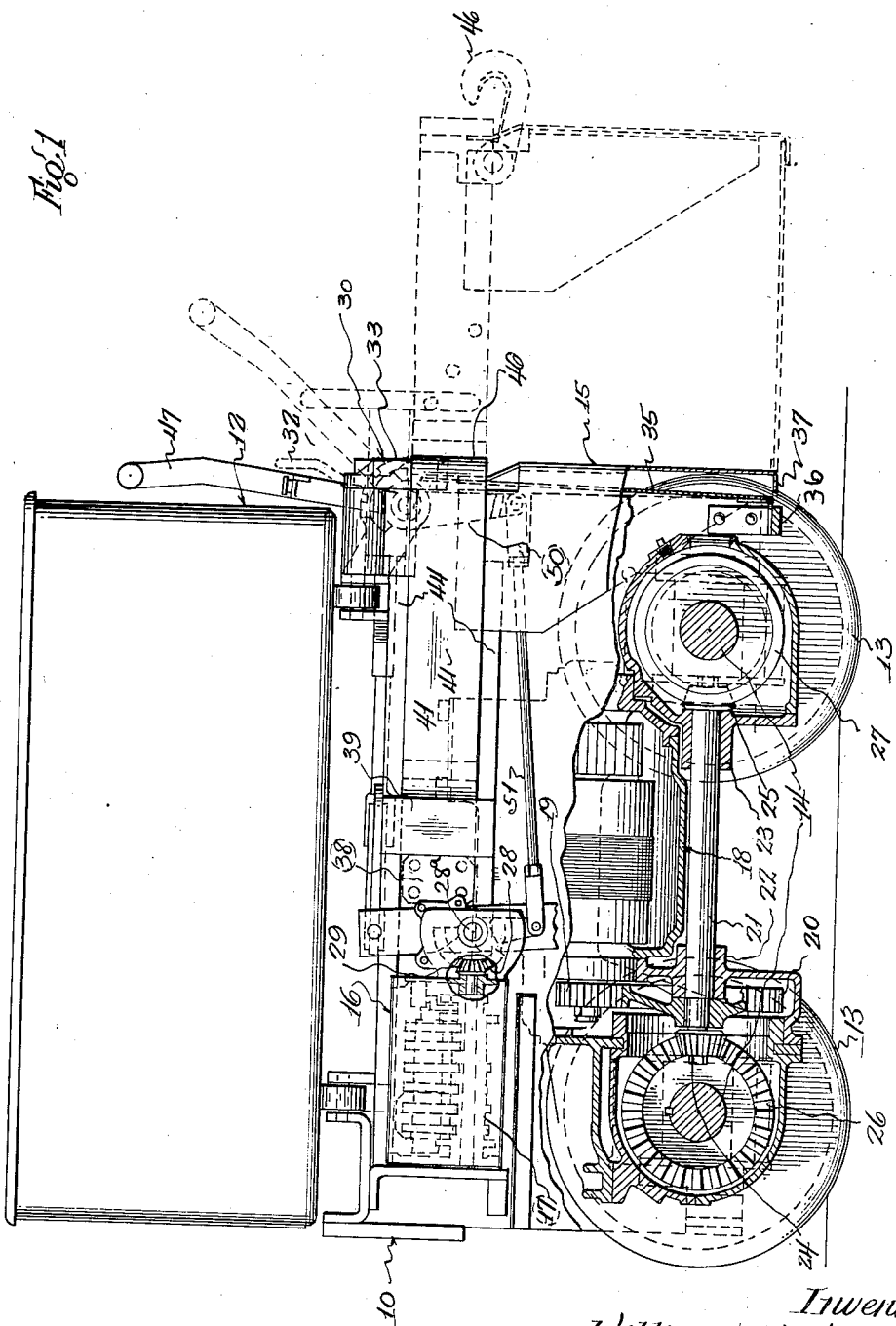

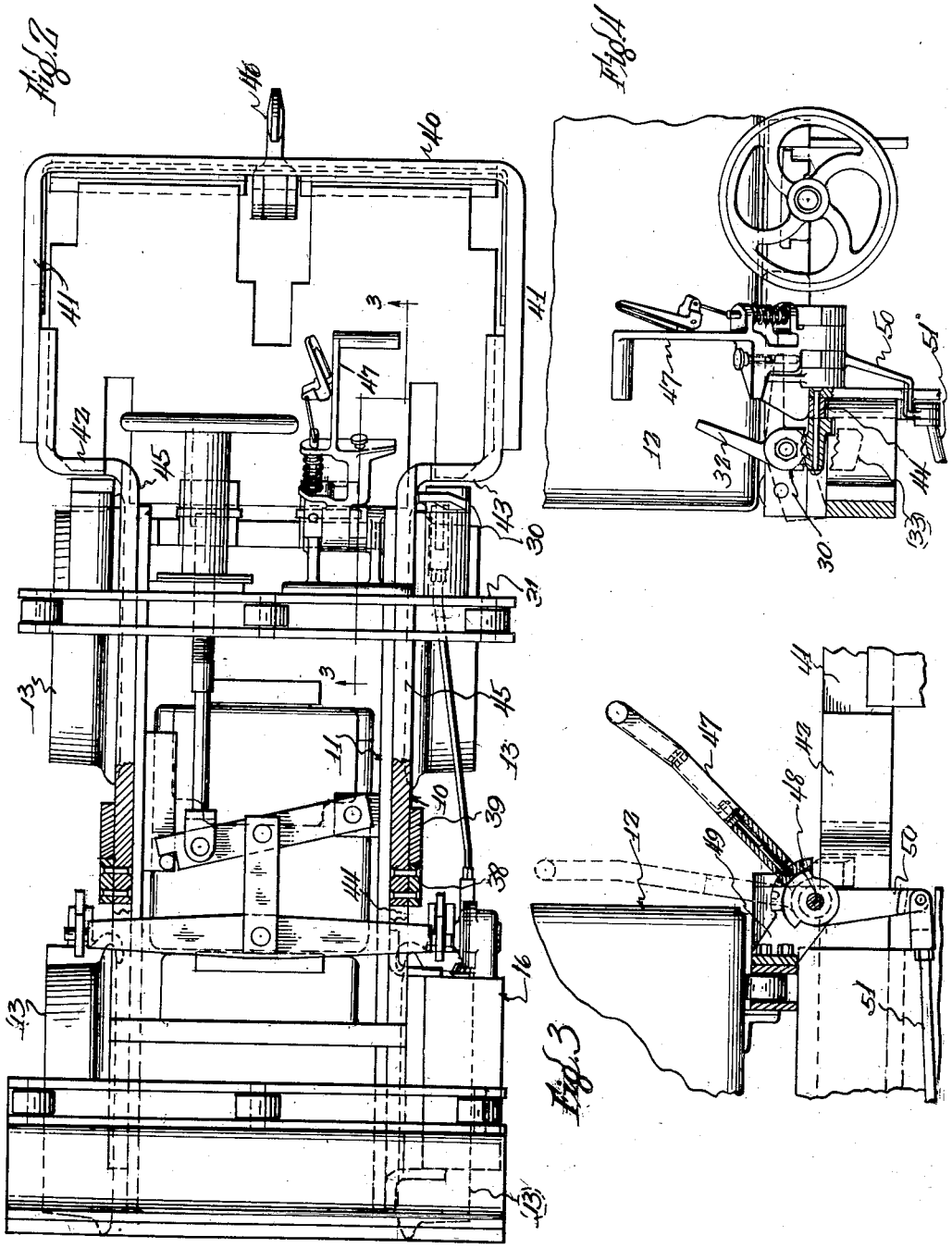

1,692,873

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

ELECTRIC LOCOMOTIVE.

Application filed September 24, 1927. Serial No. 221,660.

This invention relates to electric locomotives and more particularly to locomotives of the small storage battery type used in metal mines, commonly known as "trammers".

Locomotives of this type are adapted for use in metal mines, in which shafts are small and the locomotives are lifted or "skipped" from one level to another. For this purpose the locomotive must be of comparatively small dimensions, particularly as to length, and accordingly, it is desirable to provide means for removing or otherwise disposing of the end cab in order to load the locomotive into the cage.

The principal object of the present invention is to provide a locomotive of the tramming type having an improved means of disposing of the additional length afforded by the motorman's cab when necessary, and of controlling the locomotive, whereby the controller drum is actuated remotely therefrom, and a safety feature provided therefor, whereby the controlling means is locked when the end cab is in the inoperative position.

My invention may be best understood by reference to the following drawings, wherein:

Figure 1 is a side elevation of a locomotive embodying my invention, showing the end cab in inoperative position in full lines and in the extended, or operative, position in dotted lines, with parts of the former broken away to show details of the gearing;

Figure 2 is a plan top view of the locomotive with the battery box removed and showing the end cab in extended position; and Figures 3 and 4 show details of the controlling device and the locking means therefor.

Referring now to the details of the drawings, I have shown a locomotive 10 having side frame bar members 11, 11, affording support for the battery box 12, which may be clamped thereon in any well-known manner. Supporting wheels and axles 13, 13, and 14, 14, respectively, support the locomotive on the track rails. A telescoping end cab is generally indicated at 15. A laterally disposed controller of the usual type is indicated at 16, having the usual contact shaft or drum 17 thereon.

A motor 18 is provided for propelling the locomotive. Details of the drive gearing and electrical connections to the motor 18 need not herein be described, as they form no part of the present invention, excepting to point out a motor pinion 19 meshing with a spur gear 20 keyed to a longitudinal drive shaft 21 supported in bearing housings 22, 23, on the axles 14. At each end of said shaft 21 are keyed twin bevel pinions 24, 25, meshing respectively with bevel gears 26, 27, keyed to each of the axles for driving the same.

The end cab 15 comprises a substantially rectangular portion having an end wall 40, side walls 41, 41, and a base or bottom plate 35. Bar supporting members or extensions 45, 45, are riveted to the side walls 41, 41, of the end cab, being curved to form shoulders 42, 43, and therefrom extended further to register slideably with the bar frame members 11, 11, through suitable guides 44, 44. Stops 38 of the usual block construction are connected to the extension 45, 45, and register with similar stops 39, 39, on the locomotive frame to limit the outward movement of the end cab. A draw bar coupling member 46 is provided at the top of the end wall 40. The floor plate 35 is hinged at its rear end to a transverse bar extension 36 of the main frame and is adapted to be folded up against the locomotive frame when the end cab is to be telescoped, being held in the folded position by the end wall 40 when the latter is in its innermost position. Support for the floor plate 35 when lowered is afforded by a lip or edge 37 extending transversely across the lower end of the end plate 40 upon which the floor plate rests, thereby affording a supporting structure for the motorman.

Details of the controlling devices and locking means therefor will now be described:

A normally upright hand lever 47 is mounted on the inner end of a transverse shaft 48 having bearing in a mounting frame 49 at one side of the locomotive frame, adjacent the shoulder 43 of the end cab. At the opposite end of said shaft 48 is mounted a downwardly extending lever 50 to which is connected a longitudinally disposed connecting rod 51 which at its opposite or rearward end is pivotally joined to a gear sector 28 so as to rotate said sector, the latter being mounted for movement in a vertical plane on a transverse stub shaft 28ᵃ on the side frame 11, adjacent the forward end of the controller 16. A bevel pinion 29 is keyed to the forward end of the controller contact drum 17 and registers with the gear segment 28, thereby providing means whereby the locomotive may be controlled from the end cab. It will be understood that the lever 50 extends downwardly in a plane parallel with the shoulder 43, rearwardly thereof when the end cab is extended, and outside of the marginal limits of the frame member 11 and its cooperating extension 45. Movement of the hand lever 47 forwardly and downwardly causes an opposite rearward movement or thrust of the lever 50 which pushing movement is exerted on the connecting rod, causing the gear sector 28 to turn upwardly, thereby causing rotation of the controller drum in one direction. Movement of the hand lever 47 rearwardly and upwardly, in a similar manner, causes the opposite movement to take place.

Means are also provided for locking the controller in the off position when the end cab is telescoped or in its inoperative position, the same means being likewise used to prevent accidental telescoping of the end cab.

A transversely disposed stop member 30 is pivotally mounted on a longitudinal axis to a cross-bar 31 of the locomotive frame, and comprises two portions, 32 and 33, being upper and lower, respectively, the portion 33 being of greater weight than 32. The pivotal mounting of the stop 30 is arranged just rearwardly of the shoulder 43, when the end cab is in the extended position. When the end cab is in such position the stop member 30 assumes a vertical position, the lower portion 33 extending below the upper margin of the shoulder 43 and side wall 41 thereof, and in the same vertical plane with said shoulder, between said shoulder and the locomotive frame. Any sudden pushing movement on the end cab causes the shoulder and portion 33 to contact, thereby preventing inward movement of the end cab. When it is desired to telescope the cab the stop 30 is manually moved to a transverse position, thereby releasing the cab, and the portion 32 then extends forwardly of the lever 47, while the portion 33 rides loosely on the upper margin of the side wall 41. In order to free the lever 47, so the locomotive may again be started, it is necessary to withdraw the end cab, whereby when the side wall has been withdrawn beyond the shoulder 43, the portion 33 is released and automatically drops to its former vertical position.

Although I have shown and described one form in which my invention may be embodied, it will be understood that the arrangement of the various parts and the construction thereof may be altered or changed without departing from the spirit or scope of the invention. Furthermore, I do not wish to be construed as limiting myself to the specific embodiment illustrated in the drawings, excepting as it may be limited by the appended claims.

I claim as my invention:

1. A storage battery locomotive comprising a frame, supporting wheels and a motor for driving the same, a horizontally disposed controller for said motor adjacent one end of said frame having a horizontally disposed contact drum therein, and means for turning said drum from the opposite end of said frame comprising a lever and segmental gear.

2. A storage battery locomotive comprising a frame, a platform at one end of said frame adapted to telescope therewith, a draw bar adjacent the top of said platform, a motor for driving said locomotive, control means for said motor adjacent said platform, and means for locking said control means when said platform is telescoped.

3. A storage battery locomotive, comprising a frame, and a movable operator's platform which is adapted to be arranged in operative position wherein it forms an extension on one end of the frame and in an inoperative position wherein it is telescoped into said frame.

4. A storage battery locomotive provided at one end with a telescoping platform adapted to serve as a supporting structure for the motorman and having means for connecting a drawbar thereto.

5. A storage battery locomotive provided at one end with a telescoping end cab having a folding floor plate adapted to serve as a support for the motorman.

6. A storage battery locomotive provided at one end with a telescoping end cab having a folding floor plate adapted to serve as a support for the motorman in cooperation with said end cab, said floor plate being mounted on said locomotive and being foldable within said cab when the latter is telescoped.

Signed at Chicago, in the county of Cook and State of Illinois, this 19th day of September, A. D. 1926.

WILLIAM W. SLOANE.